United States Patent [19]
Iyob et al.

[11] Patent Number: 5,448,632
[45] Date of Patent: Sep. 5, 1995

[54] CALL MONITORING SYSTEM FOR INTELLIGENT CALL PROCESSING

[75] Inventors: Hannibal Iyob, Columbus, Ohio; Steven T. Kaish, Bridgewater, N.J.; Paul R. Noll, Columbus, Ohio; V. R. Gopala Rao, Holmdel, N.J.; Ronald W. Tamkin, Pataskala, Ohio; Alex C. Wilkinson, Princeton Junction, N.J.

[73] Assignee: AT&T Corp., Murray Hill, N.J.

[21] Appl. No.: 144,067

[22] Filed: Oct. 27, 1993

[51] Int. Cl.⁶ .............................................. H04M 3/42
[52] U.S. Cl. ................................. 379/201; 379/220; 379/221; 379/112
[58] Field of Search ................... 379/67, 88, 89, 201, 379/207, 211, 220, 230, 242, 265, 266, 113, 115, 134, 142, 112, 97, 127, 93, 94, 100, 244, 245, 216, 229, 212

[56] References Cited

U.S. PATENT DOCUMENTS

| | | | |
|---|---|---|---|
| 4,611,094 | 9/1986 | Asmuth et al. | 379/201 |
| 4,788,718 | 11/1988 | McNabb et al. | 379/134 |
| 5,018,191 | 5/1991 | Catron et al. | 379/207 |
| 5,311,572 | 5/1994 | Friedes et al. | 379/211 |
| 5,335,268 | 8/1994 | Kelly, Jr. et al. | 379/221 |

Primary Examiner—James L. Dwyer
Assistant Examiner—Scott Wolinsky
Attorney, Agent, or Firm—Gerard A. deBlasi

[57] ABSTRACT

Increased reliability for intelligent call processing systems is provided by collecting information from communications between the network database, the subscriber database, and the network switch. Message transfers between these network elements are monitored and correlated to identify those messages corresponding to a particular call. The messages for the call are analyzed to determine which database generated the instructions for routing the call. In particular, by comparing the routing number returned to the interexchange switch with the routing instruction information supplied by the subscriber's database, it can be determined whether the call was routed according to instructions from the subscriber's database.

24 Claims, 4 Drawing Sheets

FIG.2
200

| | |
|---|---|
| DAILED NUMBER | 202 |
| ROUTING NUMBER | 204 |
| CALL IDENTIFIER | 206 |
| REASON FOR DEFAULT ROUTING | 208 |
| SUBSCRIBER DATABASE QUERY | 210 |
| CALLER'S AREA CODE | 212 |
| ROUTING RESULT | 214 |
| TIME OF CALL | 216 |
| CALL DISPOSITION | 218 |

FIG.3
300

| | |
|---|---|
| DAILED NUMBER | 302 |
| ROUTING LABEL | 304 |
| CALL IDENTIFIER | 306 |
| CALLER'S AREA CODE | 308 |
| TIME OF CALL | 310 |
| CALLER-SPECIFIC DATA | 312 |

FIG. 4
400

| | |
|---|---|
| DAILED NUMBER | ~ 402 |
| ROUTING LABEL | ~ 404 |
| ROUTING NUMBER | ~ 406 |
| CALLS ROUTED PER ROUTING LABEL | ~ 408 |
| CALLS ROUTED PER DEFAULT INSTRUCTION | ~ 410 |
| CALLS NOT ROUTED | ~ 412 |
| REASONS FOR DEFAULT ROUTING | ~ 414 |
| CALLER-SPECIFIC DATA | ~ 416 |
| CALL DISPOSITION | ~ 418 |

FIG. 6
600

| | |
|---|---|
| DAILED NUMBER | ~ 602 |
| ROUTING NUMBER | ~ 604 |
| ROUTING LABEL | ~ 606 |
| CALL IDENTIFIER | ~ 608 |
| REASON FOR DEFAULT ROUTING | ~ 610 |
| SUBSCRIBER DATABASE QUERY | ~ 612 |
| CALLER'S AREA CODE | ~ 614 |
| TIME OF CALL | ~ 616 |
| CALL DISPOSITION | ~ 618 |

CALL MONITORING SYSTEM FOR INTELLIGENT CALL PROCESSING

TECHNICAL FIELD

The invention relates to systems for routing telephone calls in which a dialed telephone number is translated into a routing number and, more particularly, to systems in which the translation of the dialed number is performed according to instructions from a database maintained by a telephone subscriber.

BACKGROUND OF THE INVENTION

Telephone systems which translate a dialed telephone number into a routing number for routing a telephone call are well known in the art. For example, toll-free or "800" number calls involve translating a dialed 800 number into a number for routing calls to an 800 number subscriber. The translation is performed by querying a database maintained by the telephone service provider, such as an 800 number database of an interexchange carrier, to determine a routing number for routing the call.

Recent advances in processing telephone calls in which the dialed number is translated into a routing number for call routing have enabled the translation process to be controlled in part by the subscriber. In such systems, referred to herein as "Intelligent Call Processing" (ICP) systems, the subscriber maintains its own database to store routing instructions for selected special service calls. The subscriber's database is queried by a processor (also referred to herein as a "Network Control Point" or "NCP") in the communication system, at an appropriate point in call processing, to return routing instructions. The subscriber's database returns routing instruction information to the NCP, which in turn, provides call routing instructions to telephone switches within the communication system.

Intelligent Call Processing systems provide a subscriber with improved call handling ability and increased flexibility. However, sometimes calls cannot be processed and routed according to instructions from the subscriber's database, and the subscriber does not have sufficient information to determine when, how often, or why this occurs. For example, if the subscriber's database does not respond to a query for instructions within a prescribed time period, the call is routed according to default routing instructions that are stored within the NCP. Similarly, default routing instructions are used when instructions returned by the subscriber's database in response to a query are not in a format recognizable to the NCP. Under these circumstances, the subscriber has no way to verify whether calls are being routed as the subscriber intends, and thus cannot determine how well the system is working.

SUMMARY OF THE INVENTION

Increased reliability for intelligent call processing systems is provided by collecting information from communications between the NCP, the subscriber's database, and the network switch that will route the call. Message transfers between these network components are monitored and correlated to identify those messages corresponding to a particular call. The messages for the call are analyzed to determine which database (i.e., the NCP or the subscriber's database) generated the final instructions for routing the call. In particular, by comparing the routing number returned to the interexchange switch with the routing instruction information supplied by the subscriber's database, it can be determined whether the call was routed according to instructions from the subscriber's database.

In an exemplary embodiment of the invention, communications are monitored between an interexchange switch and an NCP, and between the NCP and a subscriber's database. The communications between these network components are correlated to identify those communications which correspond to a particular call. Selected information from the identified communications is collected and assembled into a call record. The call record indicates, among other things, whether the interexchange switch routed the call according to information from the subscriber's database or according to preselected default routing instructions stored within the NCP. For calls routed according to the default instructions, the call record also identifies the reason that instructions from the subscriber's database were not used to route the call. Several call records are assembled in a convenient format for access by the subscriber.

In another exemplary embodiment of the invention, messages transferred to and from the NCP are collected and correlated within the NCP. Message correlation can be accomplished, for example, on the basis of identifiers within the messages which uniquely identify a call. Information is extracted directly from the messages that pass between the NCP and each of the interexchange switch and subscriber database, thereby eliminating the need to capture messages as they pass between the system components. The NCP assembles selected data for each call into a single call record.

BRIEF DESCRIPTION OF THE DRAWINGS

In the drawings:

FIG. 2 shows the structure of an exemplary call record which stores information passed along message paths 1 and 4 of FIG. 1;

FIG. 3 shows the structure of an exemplary call record which stores information passed along message paths 2 and 3 of FIG. 1;

FIG. 4 shows the structure of an exemplary traffic summary record constructed in accordance with the invention;

FIG. 6 shows the structure of an exemplary call record which stores information passed along message paths 1 through 4 of FIG. 5.

DETAILED DESCRIPTION

Figure 1:
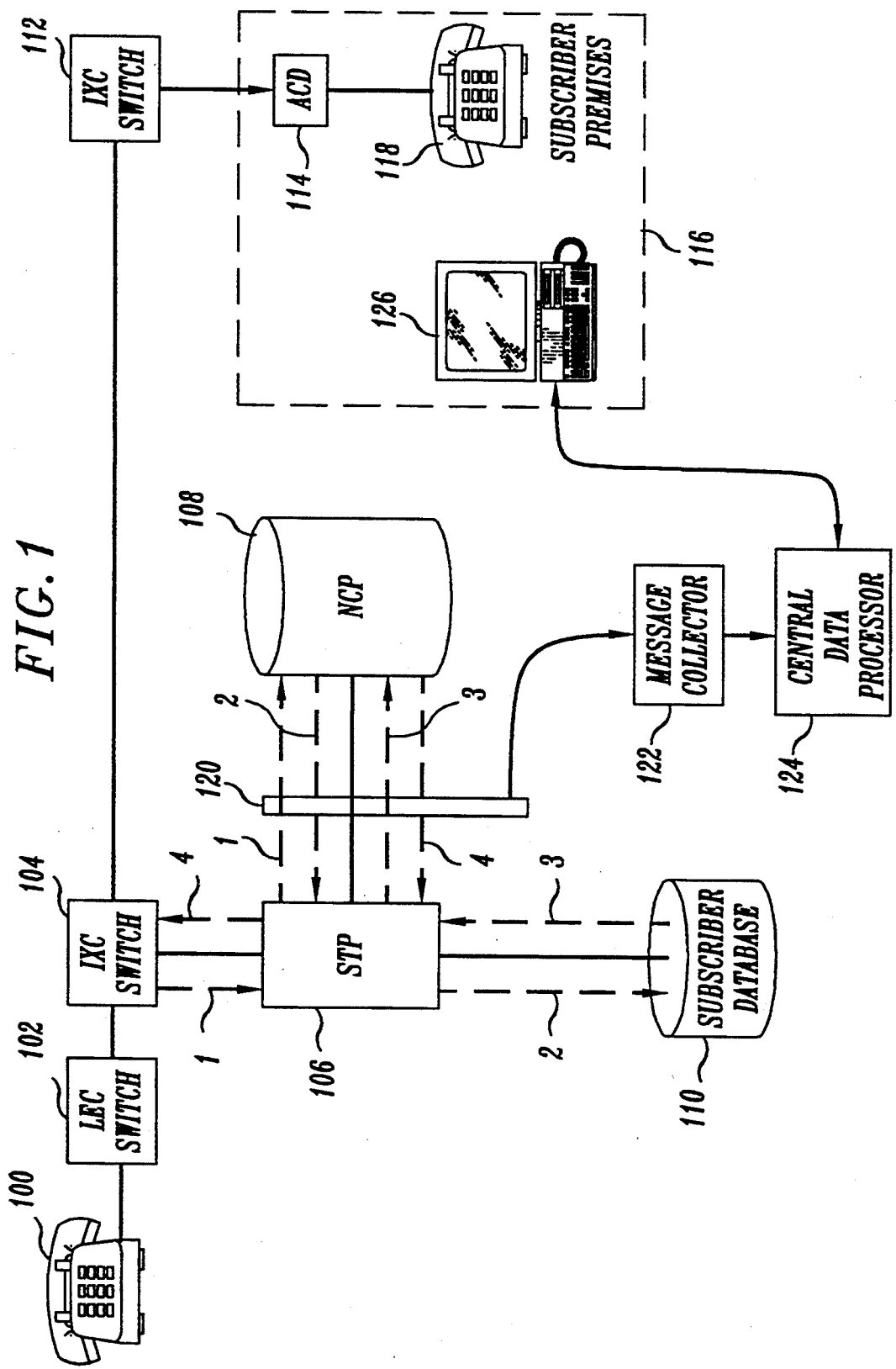
FIG. 1 is a simplified block diagram of a communications network configured to monitor message transfers between network elements in accordance with the principles of the invention.

FIG. 1 shows a diagram of a communications network, having ICP capabilities, constructed in accordance with the principles of the invention. The communications network includes a telephone station 100, a local exchange carrier (LEC) switch 102, interexchange carrier (IXC) switches 104 and 112, a switching transfer point (STP) 106, an NCP 108, and a subscriber database 110. Although STP 106 is shown in the figure as a single network element, it is to be understood that communications between IXC switch 104, NCP 108 and subscriber database 110 are routed through a network of switching transfer points. The communications network routes calls to an automatic call distributor (ACD) 114 and a telephone station 118 at a subscriber's premises 116. The network also includes a message capture means 120, a message collector 122, and a central data processor 124, which collectively provide information about a subscriber's ICP service to a workstation 126 at subscriber premises 116.

The communications network of FIG. 1 routes telephone calls by first translating a dialed number into a different number (a "routing number") which is used to route the call. Telephone calls involving such dialed number translations are referred to generally herein as "special service" calls. Special service calls include, for example, 800 calls and premium service calls (calls for which the caller typically pays at least a portion of the telephone charges and often an additional premium).

Before describing the novel aspects of the present invention, it will be useful to describe the operation of an ICP system. As mentioned above, an ICP system routes calls by translating a dialed number into a routing number on the basis of information contained in a subscriber database. An example of one such system is described in commonly-owned, U.S. Pat. No. 4,611,094, issued Sep. 9, 1986, entitled "Method for Customer Definable Telephone Capability," which is hereby incorporated by reference.

The ICP system works as follows. A caller at telephone station 100 of FIG. 1 places a special service call, for example, by dialing an 800 number. The call is extended to LEC switch 102, which switches the call to IXC switch 104. IXC switch 104 sends a message through STP 106 to query a network database, such as NCP 108, for routing instructions. NCP 108 processes the query from IXC switch 104 and, where appropriate, accesses the ICP capabilities of the network by querying a subscriber database 110 to obtain call routing instructions established by the subscriber. Whether a given call is to be routed using ICP may be determined, for example, from a conventional 800 number routing plan used by NCP 108 to determine call routing. The path of the query from IXC switch 104 to NCP 108 (referred to as the "message path") is indicated by the dashed line labeled by reference number 1. NCP 108 queries subscriber database 110 by sending a message (along a message path 2) to database 110 via STP 106. Subscriber database 110 responds to NCP 108 by sending a message (along a message path 3) containing routing instructions through STP 106. The routing instructions typically include a "routing label," which NCP 108 uses to identify a corresponding, unique routing number. When NCP 108 receives suitable instructions from subscriber database 110, or after some predetermined timeout period, NCP 108 returns a routing number to IXC switch 104. NCP 108 provides this information to IXC switch 104 in a message transmitted along a message path 4. IXC switch 104 then routes the call according to the routing number, for example, to IXC switch 112. IXC switch 112 routes the call to ACD 114 at the subscriber premises 116. ACD 114 switches the call to a telephone station 118 at the subscriber premises.

The network components described above and the signaling techniques for communicating between those network components are well known by those skilled in the art. For example, LEC switch 102 illustratively is a 5ESS ® switch manufactured by American Telephone & Telegraph Co., Inc. (AT&T). IXC switch 104 illustratively is a 4ESS TM switch manufactured by AT&T, but alternatively could be a local exchange switch. NCP 108 illustratively includes an INWATS database NCP and a Direct Services Dialing NCP, both commercially available from AT&T. Exemplary message formats for messages transmitted on message paths 2 and 3 are described in TR54022, AT&T Intelligent Call Processing (ICP) Service Signaling System No. 7 Network Interface Specification, May 1, 1993, which is publicly available and hereby incorporated by reference.

The system described above enables a subscriber to customize and maintain its own database for routing calls. The subscriber is able to quickly change call routing and to implement specialized features which are otherwise unavailable through service provided by the interexchange carrier. However, various factors affecting the network may prevent NCP 108 from utilizing instructions provided by subscriber database 110 for routing the call. For example, the response from subscriber database 110 may contain errors or may be in a form not recognizable by NCP 108. Also, subscriber database 110 may not provide a timely response to NCP 108. In such cases NCP 108 will respond to the query from IXC switch 104 (message path 1) by supplying a default routing number (via message path 4).

Current ICP systems do not provide a mechanism for reporting to the subscriber whether calls are being routed by IXC switch 104 in accordance with the routing instructions provided by subscriber database 110. In particular, the subscriber cannot determine which calls are being routed according to instructions from subscriber database 110 and which calls are being routed according to default routing instructions provided by NCP 108. Moreover, the subscriber lacks a mechanism for diagnosing the problems which cause NCP 108 to supply default routing instructions to IXC switch 104.

In accordance with the invention, a method is provided for the subscriber to verify that a call is being routed according to routing instructions provided by subscriber database 110. Messages transferred between IXC switch 104 and NCP 108, and messages transferred between NCP 108 and subscriber database 110, are captured and correlated to identify all messages corresponding to a particular call. Selected information from the messages transferred between NCP 108 and IXC switch 104 for the call is compared with selected information from the messages transferred between NCP 108 and subscriber database 110 for the same call to determine whether the call was routed according to the subscriber's instructions.

In an exemplary embodiment of the invention, message collector 122 stores a mapping of routing numbers to routing labels and uses this information to determine whether a given call was routed according to routing instructions from subscriber database 110. The routing number is extracted from messages that were transmitted between NCP 108 and IXC switch 104. The routing label is extracted from messages that were transmitted between subscriber database 110 and NCP 108 and compared with the routing number. A determination that the extracted routing number does not map to the extracted routing label causes message collector 122 to generate an indication that the call was routed using a default routing number rather than according to routing instructions from subscriber database 110.

In an alternative embodiment, message collector 122 does not contain a mapping of routing numbers to routing labels, but instead analyzes other data collected from the messages transferred between IXC 104, NCP 108, and subscriber database 110 to determine whether a default routing number was used. For example, call billing record information which identifies to whom and at what rate the call is to be billed can be used to determine whether a default routing number was used. Call billing record information, such as a special billing code which indicates that default routing was used, typically is sent from NCP 108 to IXC switch 104 (via message path 4). By detecting this special billing code, message collector 122 determines, indirectly, that a default routing number was used.

Referring again to FIG. 1, messages on each of the four message paths (paths 1–4) are captured by message capture means 120. Message capture means 120 is interposed in the trunks between STP 106 and NCP 108. Message capture means 120 copies the messages passing between NCP 108 and STP 106, and outputs the copied messages to message collector 122. Message capture means 120 illustratively is an Enhanced Message Sampling Board (Ver. 2) available from AT&T, but could be any device which monitors and copies selected messages from message paths 1 through 4. Suitable monitoring apparatus for implementing message capture means 120 also is disclosed in U.S. Pat. No. 4,788,718, which is hereby incorporated by reference.

As described in greater detail below, message collector 122 correlates the messages on message paths 1 through 4 to identify all those messages associated with a particular call. For each call, message collector 122 generates two "call" records 200 and 300 (shown in FIGS. 2 and 3). Call record 200 contains data copied from the messages on message paths 1 and 4. Call record 300 contains data copied from the messages on message paths 2 and 3. A unique identifier preferably is assigned for each call to facilitate correlating the call records 200 and 300 which correspond to each call. Message collector 122 may be implemented, for example, using a workstation commercially available from Sun Microsystems, Inc. A separate message collector 122 is provided for each NCP 108 in the communications network. Alternatively, multiple NCPs (not shown) are coupled to a single message collector 122.

Message collector 122 outputs call records 200 and 300 to central data processor 124. Central data processor 124 aggregates call records received from message collector 122 and compiles the data in those records to produce a "traffic summary" record 400 (see FIG. 4). A exemplary traffic summary record 400 would include, for example, a summary of the data for all telephone calls placed to a particular dialed number over a selected time period. The subscriber is given the ability to access the traffic summary records by accessing central data processor 124, or the traffic summary records are automatically downloaded to a workstation 126.

As its name suggests, central data processor 124 is implemented in a centralized location and is configured to receive information from each of the individual message collectors 122 deployed within the communications network. Central data processor 124 illustratively is implemented as a mainframe computer, but one skilled in the art will appreciate that any computer means having sufficient processing power could be used.

FIG. 2 shows the content and format of an exemplary call record 200 generated by message collector 122. Call record 200 includes several fields, each of which includes information about a particular call. The first field in call record 200 is a "Dialed Number" field 202. Dialed Number field 202 stores the telephone number that was dialed by the caller at telephone station 100 (FIG. 1). Dialed Number field 202 serves as an identifier for the call record so that the call record can be compiled by central data processor 124 with other call records for the same dialed number.

Two other key data fields in call record 200 are the "Routing Number" field 204 and the "Call Identifier" field 206. Routing Number field 204 contains information which identifies the destination to which the call actually was routed (as specified by NCP 108). Call Identifier field 206 stores a unique call identifier, such as a number, for each call. The call identifier from field 206 is used to facilitate correlating messages for a given call passing on message paths 1 through 4.

Call record 200 preferably includes a field containing information which indicates, for those calls routed according to default routing instructions, the reason that the subscriber-prescribed routing was not used. This field is shown in FIG. 2 as the "Reason for Default Routing" field 208. Field 208 contains flags representing the following "error" messages: (1) NCP 108 does not contain a mapping of the routing label to the routing number; (2) NCP 108 cannot read the message it received from subscriber database 110 (on message path 3); (3) the routing label in the subscriber database response message (on message path 3) is not in a format recognizable by NCP 108; (4) NCP 108 did not receive a timely response to its query of subscriber database 110; (5) the subscriber database response message indicated that subscriber database 110 could not process the query message from NCP 108 (on message path for example, because the message was garbled in transmission or because subscriber database 110 did not recognize the dialed number; or (6) no query was sent from NCP 108 to subscriber database 110 due to network management reasons, for example, because sending the message would have caused subscriber database 110 to become overloaded.

The information used to populate field 208 typically is generated by NCP 108. For example, a timer is set in NCP 108 when the NCP sends a query (via message path 2) to subscriber database 110. If NCP 108 does not receive a response to the query (along message path 3) before a predetermined time-out period expires, the NCP indicates that a response was not received from subscriber database 110 in time to be used for routing. In a second example, if the routing label does not match the format required by NCP 108 or does not correspond to a routing number stored within the NCP, NCP 108 generates an appropriate message/flag signaling the reason for default routing.

Referring again to FIG. 2, other information may be included in call record 200, if desirable. For example, call record 200 may include a "Subscriber Database Query" field 210 to indicate whether NCP 108 queried subscriber database 110 (i.e., whether the call was a regular 800 service call or an ICP call involving a translation based on information from subscriber database 110). Record 200 also may include a "Caller's Area Code" field 212 or "Automatic Number Identifier" field (not shown). Call record 200 may include a "Routing Result" field 214 to indicate whether the call was either routed to the destination identified by the routing label, routed to a default location, or not routed at all by NCP 108 for network management reasons (e.g., too many calls were made to this 800 number within a predetermined time interval). A "Time of Call" field 216 may be provided as a convenient means for organizing call records into a traffic summary record according to preselected time intervals. A "Call Disposition" field 218 stores the disposition status (e.g., busy, answered, ring-no answer) of the call as determined by a message returned from switch 112 to switch 104.

NCP 108 can be configured to measure and report the elapsed time between querying subscriber database 110 and receiving a response from subscriber database 110 at NCP 108. NCP 108 begins timing when a query is sent to the subscriber database via message path 2, and stops timing when a response is received via message path 3. The elapsed time is recorded in a field (not shown) in call record 200 for delivery to the subscriber as part of a traffic summary record.

FIG. 3 shows the content and format of an exemplary call record 300 for storing information passing between NCP 108 and subscriber database 110. Call record 300 includes a "Dialed Number" field 302, a "Routing Label" field 304, a "Call Identifier" field 306, a "Caller's Area Code" field 308, and a "Time of Call" field 310. Routing Label field 304 contains the routing label specified by subscriber database 110. The remaining fields store the same information as their counterparts of the same name in call record 200. Additionally, a "Caller-Specific Data" field 312 is provided to hold data returned by subscriber database 110 that is specific to the caller. This caller-specific data could be passed to IXC switch 104 for routing with the call to subscriber premises 116, and could be retrieved from subscriber database 110, for example, on the basis of the caller's ANI.

FIG. 4 shows an exemplary traffic summary record 400. As described above, the traffic summary record is a compilation of information from many call records, including information from both call record 200 and call record 300. Traffic summary record 400 typically is organized according to the dialed number. Traffic summary record 400 includes fields such as the "Dialed Number" field 402, "Routing Label" field 404, and "Routing Number" field 406. Traffic summary record 400 also includes fields which provide a tally of: the number of calls routed according to the routing label returned by subscriber database 110 (field 408), the number of calls routed according to a default routing number stored within NCP 108 (field 410), and the number of calls not routed for reasons of network management expediency (field 412). A "Reasons for Default Routing" field 414 provides a count of the number of calls which were routed using default routing instructions for each of the "errors" described with respect to field 208 of call record 200. Traffic summary record 400 also may include a "Caller-Specific Data" field 416, which includes caller-specific data sent from subscriber database 110 to be included in the call (e.g., caller's Social Security number) and a field which stores a summary of call dispositions (field 418). One skilled in the art will appreciate that other fields can be provided without departing from the scope of the invention, such as fields to report the number of regular 800 service calls (for which no ICP query was sent to subscriber database 110) and the number of ICP queries sent to subscriber database 110.

Figure 5:
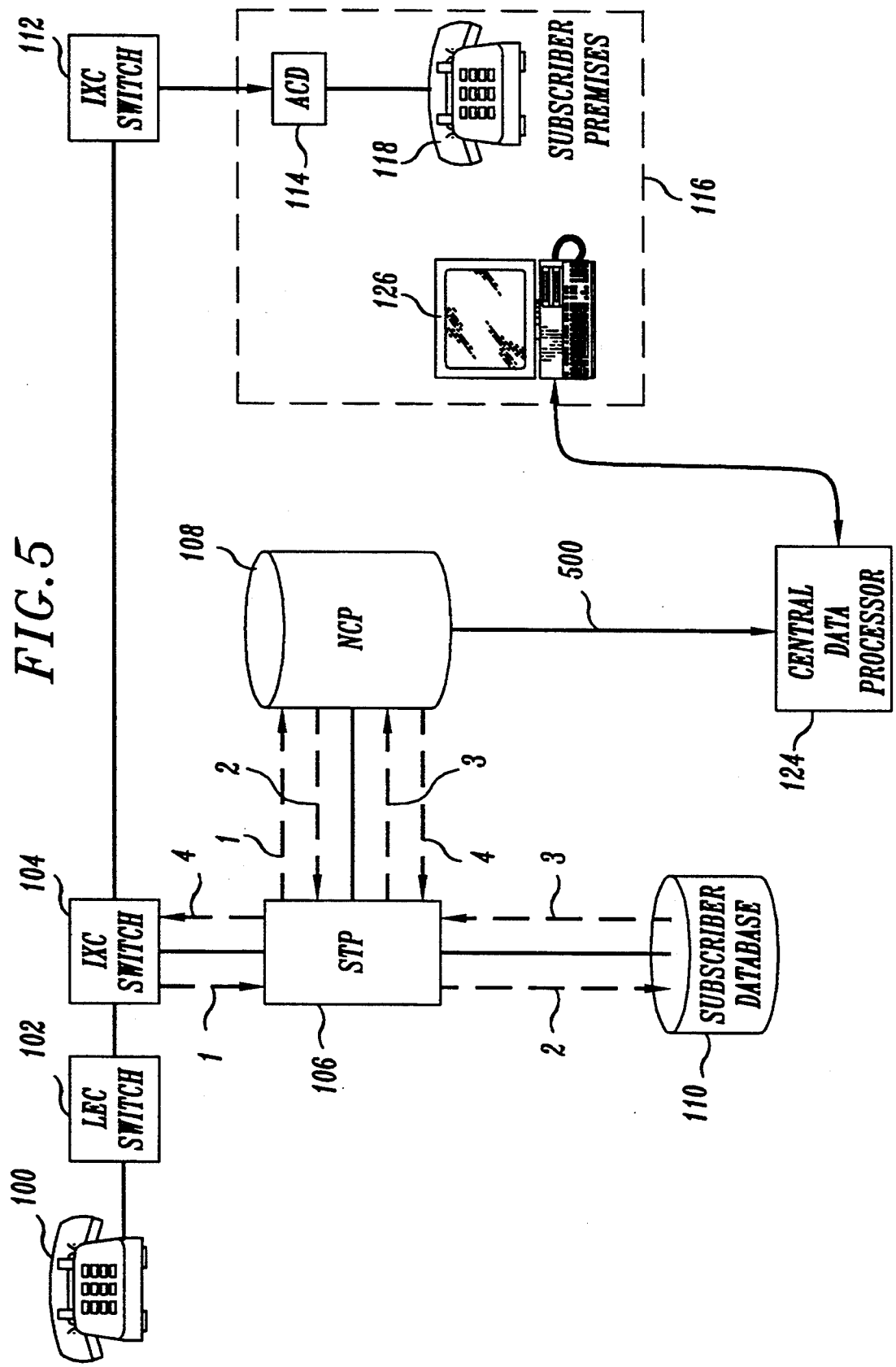
FIG. 5 is a simplified block diagram of an alternative embodiment of the network of FIG. 1.

FIG. 5 shows an alternative embodiment of the ICP monitoring system of the present invention. In the embodiment of FIG. 5, messages transferred to and from NCP 108 are collected and correlated within NCP 108. Message correlation can be accomplished, for example, on the basis of identifiers within the messages which uniquely identify a call. Information is extracted from the messages that pass on message paths 1 through 4 by NCP 108 directly, thereby eliminating the need to monitor messages using message capture means 120 and message collector 122 of FIG. 1. NCP 108 assembles predetermined data for each call into a single data record 600 (see FIG. 6). NCP 108 outputs the data records to central data processor 124 via line 500. Central data processor 124 compiles the data records received from NCP 108 into traffic summary records 400 in the manner described above with respect to FIG. 1. Central data processor 124 makes the traffic summary records available to the subscriber via a computer means 126 at the subscriber's premises.

FIG. 6 shows an exemplary call record 600 that is generated by NCP 108 for each call. Call record 600 includes a "Dialed Number" field 602, a "Routing Number" field 604, a "Routing Label" field 606, a "Call Identifier" field 608, a "Reason for Default Routing" field 610, a "Subscriber Database Query" field 612, a "Caller's Area Code" field 614, a "Time of Call" field 616, and a "Call Disposition" field 618. Each of these fields store the same information as their counterparts of the same name in call records 200 and 300, described above. However, because all of the information used to populate record 600 is obtained from NCP 108 directly in the embodiment of FIG. 5, a single record is used to store this information (rather than the two records of FIGS. 2 and 3).

It will be apparent to one skilled in the art that other modifications can be made to the described embodiments without departing from the scope of the invention. For example, the system could be modified to capture specific information (e.g., a personal identification number or "PIN," "frequent flyer" identification number, or account number) passed from the subscriber database and to forward the captured information with the call. Similarly, the described embodiments could be modified to use selected non-routing information (such as a caller's account number, social security number, or PIN) as the basis for determining whether calls placed by a particular caller are being routed according to routing instructions retrieved from subscriber database 110. For example, a subscriber database could maintain a record of a particular account representative preferred by an individual customer and automatically route calls from that customer to the preferred representative. The principles of the invention could then be utilized to report to the subscriber, on a customer-by-customer basis, whether calls from a given customer were routed according to the instructions stored within subscriber database 110. The monitoring system also could be used as a general maintenance tool to monitor the subscriber database performance.

We claim:

1. A method for use in a telecommunications system which routes special service calls according to routing instructions obtained from a subscriber database, the method comprising the steps of:

determining the routing instructions output by the subscriber database for a special service call;

comparing the routing instructions output by the subscriber database with the routing instructions actually used to route the special service call; and responding to the result of the comparing step to provide an indication of whether the special service call was routed according to the routing instructions output by the subscriber database.

2. The invention of claim 1 wherein the comparing step comprises comparing a routing label output by the subscriber database for routing the special service call with the routing number used to route the special service call.

3. The invention of claim 1 wherein the responding step comprises generating an indication that the special service call was routed using a default routing instruction.

4. The invention of claim 1 further comprising the step of providing an indication of why the special service call was not routed according to the routing instructions output by the subscriber database.

5. The invention of claim 1 further comprising the step of determining the elapsed time between initiation of a query for routing instructions of the subscriber database by a network processor and receipt by the network processor of a response to the query.

6. A method for use in an intelligent call processing system, the method comprising the steps of:
monitoring message transfers between a network special service call database, a subscriber database, and a network switch;
correlating messages corresponding to a predetermined special service call; and
analyzing selected information derived from the messages of the predetermined special service call to determine whether the special service call was routed according to routing instructions specified by the subscriber database.

7. The invention of claim 6 wherein the correlating step comprises identifying messages corresponding to the special service call on the basis of an identifier unique to the special service call.

8. The invention of claim 6 wherein the selected information includes a routing label specified by the subscriber database and a routing number specified by the network special service call database.

9. The method of claim 6 wherein the selected information comprises billing record information which indicates how the special service call was routed.

10. The invention of claim 6 further comprising the step of generating an indication of whether the special service call was routed according to routing instructions specified by the subscriber database.

11. The invention of claim 10 wherein the generating step comprises generating an indication that the special service call was routed using a default routing instruction.

12. The invention of claim 10 further comprising the step of providing an indication of why the special service call was not routed according to the routing instructions output by the subscriber database.

13. The invention of claim 6 further comprising the step of correlating the results of the analyzing step with non-routing information.

14. The invention of claim 13 wherein the correlating step comprises determining on a caller-by-caller basis whether the special service call was routed according to routing instructions specified by the subscriber database.

15. A method for use in an intelligent call processing system, the method comprising the steps of:
monitoring messages received by a network special service call database from a network switch and from a subscriber database;
correlating messages corresponding to a predetermined special service call; and
analyzing selected information derived from the messages of the predetermined special service call to determine whether the special service call was routed according to routing instructions specified by the subscriber database.

16. The invention of claim 15 wherein the correlating step comprises identifying messages corresponding to the special service call on the basis of an identifier unique to the special service call.

17. The invention of claim 15 wherein the selected information includes a routing label specified by the subscriber database and a routing number specified by the network special service call database.

18. The method of claim 15 wherein the predetermined information comprises billing record information which indicates how the special service call was routed.

19. The invention of claim 15 further comprising the step of determining the elapsed time between initiation of a query for routing instructions of the subscriber database by a network processor and receipt by the network processor of a response to the query.

20. The invention of claim 15 further comprising the step of generating an indication of whether the special service call was routed according to routing instructions specified by the subscriber database.

21. The invention of claim 20 wherein the generating step comprises generating an indication that the special service call was routed using a default routing instruction.

22. The invention of claim 20 further comprising the step of providing an indication of why the special service call was not routed according to the routing instructions output by the subscriber database.

23. The invention of claim 15 further comprising the step of correlating the results of the analyzing step with non-routing information.

24. The invention of claim 23 wherein the correlating step comprises determining on a caller-by-caller basis whether the special service call was routed according to routing instructions specified by the subscriber database.

* * * * *